March 5, 1968 F. J. CLEMENT 3,372,239
VOICE-SWITCHED INTERPHONE SYSTEM
Filed July 1, 1964
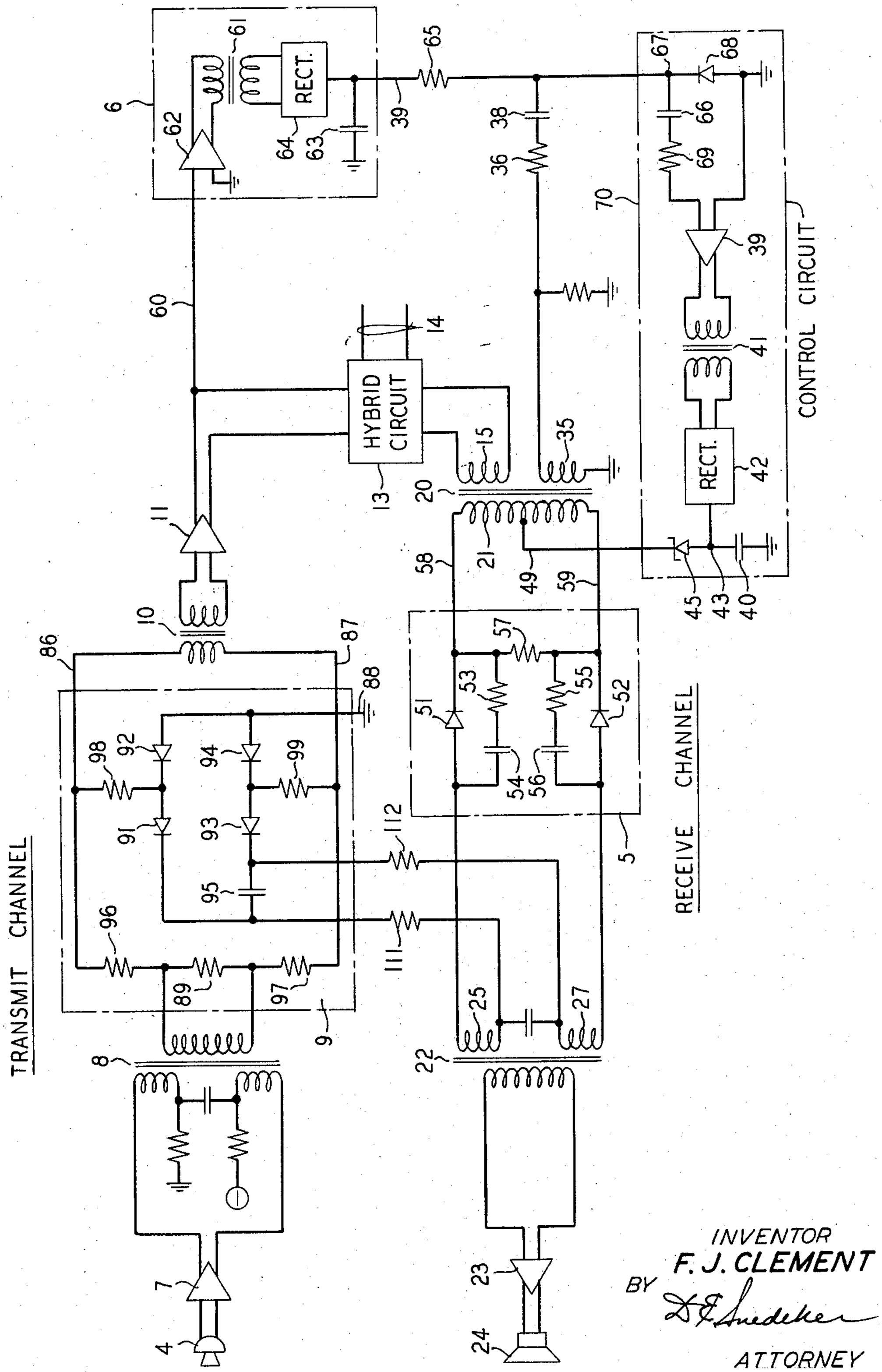
INVENTOR
F. J. CLEMENT
BY D. E. Snedeker
ATTORNEY

United States Patent Office 3,372,239
Patented Mar. 5, 1968

3,372,239

VOICE-SWITCHED INTERPHONE SYSTEM

Frank J. Clement, Matawan, N.J., assignor to Bell Telephone Laboratories, Incorporated, New York, N.Y., a corporation of New York Filed July 1, 1964, Ser. No. 379,454
12 Claims. (Cl. 179—81)

ABSTRACT OF THE DISCLOSURE

In a loudspeaker telephone system, variolossers insert complementary losses into the transmit and receive channels respectively to reduce acoustical and transhybrid feedback. A direct current flowing through parallel branches of a control circuit regulates the loss inserted by each variolosser, the control circuit being constructed in such a way that clipping and variolosser unbalance are minimized.

This relates to communication systems and more particularly to voice-switched communication systems employing variolossers in the transmit and receive channels thereof.

Voice-switched communication systems are well known for example in the loud-speaking telephone art, an individual telephone station therein conventionally including a microphone in the transmit channel and an adjacent loudspeaker in the receive channel. The microphone and loudspeaker in such systems are coupled through hybrid and acoustic sidetone paths to form a feedback loop. Voice switching arrangements using variolossers in the transmit and receive channels have been employed in an attempt to minimize the undesirable effects of this coupling by controlling the energy propagating through the respective channels such that only one of the channels is operative at a time. Under control of signals derived from speech energy in the transmit and receive channels, the variolossers function to vary inversely the insertion loss in the respective channels.

It was known heretofore to employ diode variolossers of the balanced-ladder type to reduce the presence of objectionable audible control current transients during switching of the loss in and out of a channel and to minimize the problem of alternating current coupling between the variolossers. The alternating current impedance of a diode is inversely related to the value of direct current flowing therethrough, and thus to provide the variolossers with complementary loss switching action the diodes are conventionally located in the series legs of the variolossers in one of the channels and in the shunt legs of the variolosser in the other channel. The variolossers are interconnected in circuit with an arrangement for deriving control current from speech energy in one of the channels. In the absence of speech energy in the one channel, no control current is applied to the variolossers and thus a high insertion loss is presented by the variolosser in the one channel and the variolosser in the other channel presents a low insertion loss. Application of control current to the two variolossers, upon detection of speech energy in the one channel, switches the loss from the one channel and inserts loss into the other channel.

The loss switching characteristics of the variolossers in the transmit and receive channels must match or track each other in a complementary fashion. Any significant departure from a complementary switching relationship between the two variolossers will seriously impair the performance of the system. In particular, it can result in a reduction of the stability margin which may produce singing or adverse switching effects. A principal cause of deviations in the variolosser switching characteristics lies in variations of the components from their nominal values, particularly diode alternating current impedance variations. Moreover, the individual diodes may exhibit varying direct current resistances which affect the control current flow through the several variolosser legs and thus the alternating current impedances of the diodes therein.

These problems have been alleviated to some extent in the past by careful selection and matching of the characteristics of the individual diodes to be employed in the variolossers. Further, as shown for example in W. F. Clemency—W. D. Goodale, Jr. patent application Ser. No. 60,476, filed Oct. 4, 1960, now Patent 3,171,901, issued Mar. 2, 1965, control current apportioning networks have been employed to vary the value of the control current applied to the respective variolossers. Another approach has been to increase the stability margin by switching an additional quantity of loss in one of the channels. Such prior approaches necessarily increase the cost of the voice switching arrangement and, to the extent that additional components are necessary for current apportioning, the size and complexity of the system become undesirably increased.

A further problem present in prior voice-switched communications systems employing variolossers, particularly those wherein additional loss is utilized in one channel to improve the stability margin, relates to the total loss switched in the two channels in going between the transmit and receive modes of operation. It is desirable to minimize the total loss switched in such systems so as to reduce the time required for switching and so as to reduce or eliminate any audible or clipping effects produced by such switching. Further, minimizing the loss switched in each channel permits the amount of fixed loss in each channel to be decreased, and therefore decreases the amount of amplification necessary to provide satisfactory signal levels.

Accordingly, it is a general object of this invention to improve the performance of voice-switched communication systems.

A more particular object of this invention is to improve variolosser switching characteristics in a voice-switched communication system.

Another object of this invention is to improve the tracking relationship between complementary variolossers.

It is a further object of this invention to minimize the loss switched in a voice communication system.

It is a still further object of this invention to reduce the amount of fixed loss required in each channel of a voice-switched communication system.

Yet another object of this invention is to reduce the effects of component variations on variolosser switching characteristics.

In accordance with a feature of the present invention, the above and other objects are attained in an illustrative embodiment of a voice-switched, loud-speaking telephone station wherein the variolosser control current path is divided into two parallel branches extending through respective halves of each of the balanced variolossers in the station transmit and receive channels. Each control current branch thus includes one-half of the series-type variolosser in the one channel and one-half of the shunt-type variolosser in the other channel. Therefore, control current derived from speech energy in the transmit and receive channels divides between the two parallel branches; and control current unbalance, such as due to variations in the characteristics of the diodes in the respective branches, tends to produce compensating changes in the switching characteristics of the individual variolossers. A resistor is connected in series with the variolosser diodes in each control current branch, the resistors being sufficiently large to make the control current flow closely proportional to the control current driving voltage, thereby further minimizing the effects of variations in the resistances of the diodes.

Another feature of the present invention is directed toward circuitry for decreasing the time required for the variolossers to switch loss in and out of the respective channels and for improving the switching characteristics of the variolossers by minimizing the total loss switched. A fixed resistance is connected in parallel with each diode in the transmission path of the series-type variolosser, and a fixed resistance is connected in series with the diodes in the shunt-type variolosser. These resistances serve to limit the maximum loss inserted in the transmit and receive channels by the variolossers, thereby limiting the loss switched in each channel. Capacitors connected in series with the resistors in the series variolosser prevent the flow of control current therethrough, and thus prevent these resistors from introducing variations in the loss switching characteristics of the variolosser.

The above and other objects and features of this invention may be fully apprehended from the following detailed description when considered with reference to the accompanying drawing, which shows an illustrative embodiment of a voice-switched, loud-speaking telephone station in accordance with the principles of the invention. Although the illustrative embodiment of the present invention shown in the drawing is depicted in a loudspeaking telephone station, it will be apparent from the description herein that the principles of the invention may be employed advantageously in other communication and transmission systems.

In the drawing the station comprises microphone 4 connected over a transmit channel through hybrid circuit 13 to line conductors 14, and loudspeaker 24 connected over a receive channel through hybrid circuit 13 to line conductors 14. Line conductors 14 extend to circuitry for interconnecting the station shown in the drawing with other stations, which may be similar to the station shown in the drawing or which may comprise conventional telephone subsets, for intercommunication therebetween. Hybrid circuit 13 which couples the transmit and receive channels to line conductors 14 may be of conventional bridge design such as is well known in the telephone art.

The transmit channel comprises amplifier 7, transformer 8, transmit variolosser 9, transformer 10 and amplifier 11, serially connected in that order between microphone 4 and hybrid circuit 13. The receive channel comprises transformer 20, receive variolosser 5, transformer 22 and amplifier 23, serially connected in that order between hybrid circuit 13 and microphone 24. Control circuit 70 derives direct current control signals from speech energy in the receive channel and applies these control signals over lead 49 to receive variolosser 5 and transmit variolosser 9 for controlling the loss inserted thereby in the respective channels. Switchguard circuit 6 is connected to the transmit channel over lead 60 and serves to guard against false operation of control circuit 70 due to sidetone coupling; that is, coupling of speech energy in the transmit channel through hybrid circuit 13 to the receive channel.

Transmit variolosser 9 and receive variolosser 5 are current-controlled variable impedance arrangements of balanced diode ladder configuration. Transmit variolosser 9 comprises two shunt legs, each including a pair of diodes connected in common through resistor 98 to one transmit channel conductor 86 and through resistor 99 to the other transmit channel conductor 87. In one leg the pair of diodes 92 and 94 have like electrodes, shown in the drawing as their cathode electrodes, joined and connected to ground; and the pair of diodes 91 and 93 in the other leg have their anode electrodes interconnected through capacitor 95. Resistors 98 and 99 serve to limit the maximum loss inserted in the transmit channel by variolosser 9, and thus to limit the loss switched in and out of the transmit channel. A resistance pad, including resistors 89, 96 and 97, is connected between the secondary winding of transformer 8 and transmit channel conductors 86 and 87.

Receive variolosser 5 comprises two series legs, each including an individual one of diodes 51 and 52 connected in series with a respective one of receive channel conductors 58 and 59 between transformers 20 and 22. Resistor 53 is connected across diode 51 and resistor 55 is connected across diode 52, resistors 53 and 55 determining the maximum insertion loss presented in the receive channel by variolosser 5 and thereby advantageously limiting the loss switched by variolosser 5. Capacitors 54 and 56 respectively connected in series with resistors 53 and 55 prevent the flow of control current through these resistors. A resistance pad including resistor 57 is connected between receive channel conductors 58 and 59.

The variolosser diodes 51, 52, and 91 through 94 are advantageously of the semiconductor variety characterized by an inverse relationship between the alternating current impedance of the diode and the value of direct current flowing therethrough. Thus, to provide the complementary loss switching action desired in the illustrative embodiment, the diodes, are located in the series legs of one of the variolossers, shown in the drawing as variolosser 5 in the receive channel, and in the shunt legs of the variolosser in the other channel, shown in the drawing as the variolosser 9 in the transmit channel. Variolossers 5 and 9 are interconnected in series with control circuit 70. In accordance with an important feature of the present invention, the control current path from control circuit 70 is divided into two parallel branches through respective halves of variolossers 5 and 9. One control current branch may be traced from lead 49 through the upper half of secondary winding 21 of transformer 20, receive channel conductor 58, diode 51, winding 25 of transformer 22, resistor 111, diodes 91 and 92, and lead 88 to ground. The other control current branch may be similarly traced from lead 49 through the lower half of winding 21, channel conductor 59, diode 52, winding 27, resistor 112, diodes 93 and 94, and lead 88 to ground. Resistors 111 and 112 are sufficiently large, relative to any variations which may occur in the direct current resistance of the variolosser diodes, to make the control current flow in each branch closely proportional to the control current driving voltage, thereby minimizing the effects of such variations in the resistances of the diodes.

The control current for varying the alternating current impedance of the several variolosser diodes is derived from speech energy in the receive channel as mentioned above, through the operation of control circuit 70. Control circuit 70 includes diode 68, which is similar to the variolosser diodes, connected between input point 67 and ground. Input point 67 is connected through capacitor 66, resistor 69, amplifier 39 and transformer 41 to rectifier circuit 42. Rectifier circuit 42 is connected to output point 43, which is connected to ground through capacitor 40 and to lead 49 through breakdown diode 45. Speech energy in the receive channel is detected by winding 35 of transformer 20 and is extended thereby through resistor 36 and capacitor 38 to input point 67 of control circuit 70. Speech energy in the transmit channel is detected over lead 60 by switch guard circuit 6 which extends a corresponding direct current signal over lead 39 through resistor 65 to input point 67. Switch guard circuit 6 includes amplifier 62, transformer 61, and rectifier circuit 64, serially connected in that order between lead 60 and lead 39, and capacitor 63 connected between lead 39 and ground. Rectifier circuits 42 and 64 may be of any known configuration such as the conventional four diode bridge arrangement.

In the idle circuit condition no speech energy is present at the station in either the transmit or the receive channel, and thus no control current is developed by control circuit 70. With no control current flowing therethrough, variolosser diodes 51, 52, and 91 through 94 are in their high alternating current impedance states. Therefore, shunt-type transmit variolosser 9 presents a low insertion loss in the transmit channel, and series-type receive variolosser 5 presents a high insertion loss in the receive channel. Accordingly, the station may be referred to as residing in its transmit mode of operation during an idle circuit condition.

Incoming speech energy over line conductors 14 is directed through hybrid circuit 13 to primary winding 15 of transformer 20 in the receive channel. If the station were to continue to reside in its transmit mode of operation, the insertion loss presented in the receive channel by receive variolosser 5 would effectively block the incoming speech energy from operating loudspeaker 24. However, a portion of the incoming speech energy is reflected through transformer 20 to winding 35 thereof and is directed through resistor 36 and capacitor 38 to input point 67 of control circuit 70. The energy appearing at point 67 is principally directed through capacitor 66, resistor 69, amplifier 39 and transformer 41 to rectifier circuit 42. Diode 68 normally presents a relatively high impedance to alternating current energy. The rectified speech energy from rectifier circuit 42 charges capacitor 40 and diode 45 breaks down to provide control current therethrough on lead 49. The control current on lead 49 divides over the above-traced parallel control current branches through receive variolosser 5 and transmit variolosser 9, the control current flowing through diodes 51, 52, and 91 through 94 switching them toward a low alternating-current impedance state. Consequently, the insertion loss presented in the receive channel by receive variolosser 5 is decreased to a low value, permitting the speech energy appearing at transformer 20 to be extended over receive channel conductors 58 and 59 through transformer 22 to loudspeaker 24.

At the same time, the insertion loss presented in the transmit channel by transmit vairolosser 9 is increased, in response to the control current flowing through diodes 91 through 94, to block any portion of the incoming speech energy which may be coupled from loudspeaker 24 to microphone 4 through acoustic coupling paths. The effect of the control current flowing through the receive and transmit variolossers, therefore, is to reverse the operating mode of the station from the transmit mode to the receive mode. Upon cessation of the incoming speech energy on line conductors 14, capacitor 40 discharges over the control current path and variolossers 5 and 9 are returned to their idle circuit condition, thereby placing the station again in its transmit mode of operation.

The control current through the two branches is relatively insensitive to variations in the characteristics of variolosser diodes 51, 52 and 91 through 94 due to resistors 111 and 112 connected in circuit therewith. Moreover, inasmuch as the control current divides through two parallel branches through respective halves of the variolossers, any control current unbalance in the two branches tends to produce compensating changes in the loss switching characteristics of the respective variolossers. Therefore, the rate of insertion of loss into the transmit channel, as the control current increases, substantially matches the rate at which loss is removed from the receive channel such that the total loss present in the receive and transmit channels remains substantially the same at all times. Similarly, the switching of loss from the transmit channel by transmit variolosser 9 substantially matches the switching of loss into the receive channel by receive variolosser 5, in response to the decay of control current upon cessation of incoming speech energy. Accordingly, the stability of the voice switching circuit is maintained without the necessity for switching addtional loss in one of the channels, without precise matching of the characteristics of each of the variolosser diodes, and without any requirement for current apportioning networks.

When the station subscriber speaks into microphone 4 during an idle circuit condition, his speech energy is directed over the transmit channel through hybrid circuit 13 to line conductors 14. If hybrid circuit 13 is properly balanced no speech energy will be coupled therethrough from the transmit to the receive channel. However, in the event that hybrid circuit 13 is not perfectly balanced, a portion of the speech energy in the transmit channel may be coupled via a sidetone path through hybrid circuit 13 to the receive channel. This sidetone energy in the receive channel is detected by winding 35 in the same manner as speech energy incoming on line conductors 14 and is applied to control circuit 70. Control circuit 70 is responsive thereto to provide control current on lead 49 which tends to switch variolossers 5 and 9 to place the station in its receive mode of operation, thereby attenuating or blocking the speech energy in the transmit channel.

To guard against this undesirable condition, the speech energy in the transmit channel is also applied on lead 60 to switchguard circuit 6, and therein through amplifier 62 and transformer 61 to rectifier circuit 64. The rectified speech energy from rectifier circuit 64 charges capacitor 63, which provides corresponding direct current on lead 39 through resistor 65 to input point 67 of control circuit 70. The direct current at point 67 is directed through diode 68 to ground, decreasing the alternating current impedance of diode 68. Speech energy detected in the receive channel and applied to input point 67 of control circuit 70 while diode 68 is in a low impedance state tends to be shunted therethrough to ground. Accordingly, control circuit 70 provides no control current in response thereto on lead 49, and variolossers 5 and 9 remain in their idle circuit condition, leaving the station in its transmit mode of operation.

It is to be understood that the above-described arrangements are merely illustrative of the principles of the present invention. Numerous other arrangements may be devised by those skilled in the art without departing from the spirit and scope of the invention.

What is claimed is:

1. In combination, a transmitting channel, a receiving channel, means for generating a control signal in accordance with the signal levels in said channels, attenuating means individually connected to said transmitting and receiving channels, said individual attenuating means each including two substantially similar circuit paths for said control signal, parallel resistive means interconnecting respective terminal points of said circuit paths in said individual attenuating means, and means for connecting said control signal from said generating means to said attenuating means circuit paths for inversely varying the gains of said transmitting and receiving channels in a complementary relationship.

2. In a communication system, first and second communication channels each including individual current controlled variable impedance means for inserting loss in said channels, a control circuit for deriving a single control current from communication energy in at least one of said channels, and means connecting said control current to said individual current controlled variable impedance means in said first and second communication channels for inversely varying the loss inserted in said channels with respect to each other, said connecting means comprising a plurality of substantially similar parallel control current paths extending through said individual variable impedance means in said first and second channels, said paths not intersecting at any point between said individual variable impedance means.

3. In combination, first and second channels each including individual current controlled variable impedance means, control circuit means for deriving a single control current from speech energy in said channels, and circuit means connecting said control current to said individual current controlled variable impedance means comprising at least two substantially similar parallel control current paths each including resistance means having greater resistance to control current flow than said current controlled variable impedance means, each said control current path extending through said individual variable impedance means in said first and second channels, whereby the gains of said channels are inversely varied in a complementary relationship.

4. In a communication system, first and second communication channels each including individual current controlled variable impedance means for inserting loss in said channels, means including said individual current controlled variable impedance means for limiting the maximum loss in each of said channels to a predetermined value, control circuit means for deriving a single control current from signals in one of said channels, circuit means including a pair of substantially similar parallel control current paths for applying said control current to said individual variable impedance means in said first and second channels for varying the impedance of said individual variable impedance means in a predetermined relationship with respect to each other, said control current paths not intersecting at any point between said variable impedance means.

5. A voice-switched communication system comprising a transmit channel, a receive channel, attenuating means individually variable in response to a single control signal connected to each of said channels, means responsive to voice energy in one of said channels for generating a single control signal, means connecting said control signal to said attenuating means for inversely varying the gains of said channels with respect to each other, said connecting means comprising at least two totally separate parallel conduction paths, each said conduction path extending through each said attenuating means.

6. In a voice-switched communication system including individual variolossers in the transmit and receive channels thereof for inversely varying the gains of said channels with respect to each other, means for maintaining the combined gain of said transmit and receive channels substantially constant at all times comprising means for interconnecting respective portions of each of said variolossers into separate parallel control current paths, said paths not intersecting at any point between said individual variolossers, and means for applying control current in common to all of said parallel control current paths in response to the detection of speech energy in a selected one of said channels.

7. In a voice-switched communication system in accordance with claim 6 said maintaining means further comprising resistance means individually connected in circuit with each of said parallel control current paths.

8. In a communication system a first channel, a second channel, individual balanced variolossers respectively connected to said first and second channels and responsive to control current for inversely varying the gains of said channels with respect to each other, means for limiting the maximum insertion loss in each of said channels, means for preventing control current flow through said limiting means, means for maintaining the total gain of said first and second channels substantially constant at all times comprising means for interconnecting respective halves of each of said balanced variolossers into separate control current paths, said paths not intersecting at any point between said balanced variolossers, and means for applying control current in common to both of said control current paths in response to the detection of communication signals in a selected one of said channels.

9. A voice-switched communication system comprising first and second communication channels each including a pair of conductors, a first variolosser having first and second legs connected in shunt between said pair of conductors of said first communication channel, a second variolosser having first and second legs each connected in series with a respective one of said conductors of said second communication channel, first circuit path means interconnecting said first legs of said first and second variolossers, second circuit path means interconnecting said second legs of said first and second variolossers, said first circuit path means and said second circuit path means not intersecting at any point between said first and second variolossers, control circuit means for deriving control current from communication signals in at least one of said communication channels, and means for connecting said first and second circuit path means to said control circuit means, whereby said first and second variolossers are responsive to said control current for inversely varying the gains of said communication channels in a complementary relationship.

10. A voice-switched communication system in accordance with claim 9 wherein said first and second variolossers comprise at least one diode connected in each leg thereof and exhibiting control current resistance of a predetermined nominal value, and wherein said first and second circuit path means each include resistance means having a higher resistance to control current flow than any variations normally occurring in the nominal value of said resistance of said diodes.

11. In a voice-switched communication system including a pair of communication channels, means responsive to speech energy in a selected one of said channels for inversely varying the gains of said communication channels in a complementary relationship, the combined gain of said channels remaining substantially constant at all times, comprising first diode means connected in series with one of said communication channels, second diode means connected in shunt with the other of said communication channels, said first and second diode means each included in a pair of substantially similar parallel control current circuit paths, said paths not intersecting at any point between said first and second diode means, each said path including at least one diode, resistance means interconnecting respective ones of each of said pairs of control current circuit paths in said first and second diode means, means for deriving control current from speech energy in said selected channel, and means for applying said control current to said control current circuit paths.

12. In a voice-switched communication system in accordance with claim 11, the combination further comprising an individual resistor connected in parallel with each control current path in said one communication channel and an individual capacitor connected in series with each said individual resistor.

References Cited

UNITED STATES PATENTS

| | | | |
|---|---|---|---|
| 3,113,181 | 12/1963 | Soderbaum | 179—1 |
| 3,171,901 | 3/1965 | Clemency | 179—1 XR |
| 3,330,912 | 7/1967 | Koseki | 179—1 XR |

KATHLEEN H. CLAFFY, *Primary Examiner.*

R. P. TAYLOR, *Assistant Examiner.*